United States Patent
Takase et al.

(10) Patent No.: US 8,535,526 B2
(45) Date of Patent: Sep. 17, 2013

(54) METHOD AND DEVICE FOR BIOGENIC WASTE TREATMENT

(75) Inventors: Joji Takase, Yokohama (JP); Jun Yang, Wuxi (JP)

(73) Assignee: Jun Yang, Wuxi (CN)

( * ) Notice: Subject to any disclaimer, the term of this patent is extended or adjusted under 35 U.S.C. 154(b) by 704 days.

(21) Appl. No.: 12/532,145

(22) PCT Filed: Mar. 20, 2007

(86) PCT No.: PCT/CN2007/000907
§ 371 (c)(1),
(2), (4) Date: Mar. 25, 2010

(87) PCT Pub. No.: WO2008/113209
PCT Pub. Date: Sep. 25, 2008

(65) Prior Publication Data
US 2011/0192791 A1   Aug. 11, 2011

(51) Int. Cl.
*B01D 19/00* (2006.01)

(52) U.S. Cl.
USPC ........... 210/188; 210/205; 422/226; 422/229; 422/242

(58) Field of Classification Search
USPC ................. 210/761, 766, 188, 205, 218, 219; 422/26, 184.1, 224, 225, 226, 229, 242; 588/312
See application file for complete search history.

(56) References Cited

U.S. PATENT DOCUMENTS

| | | | | |
|---|---|---|---|---|
| 3,751,010 | A * | 8/1973 | Latinen | 366/328.1 |
| 4,983,296 | A * | 1/1991 | McMahon et al. | 210/761 |
| 5,386,055 | A * | 1/1995 | Lee et al. | 562/512.2 |
| 2003/0147771 | A1 | 8/2003 | Hodgins | |

FOREIGN PATENT DOCUMENTS

| | | | |
|---|---|---|---|
| CN | 1711219 A | | 12/2005 |
| GB | 2066906 A | * | 7/1981 |
| JP | 2004 321855 A | | 11/2004 |
| JP | 2005095728 A | | 4/2005 |
| JP | 2006239623 A | | 9/2006 |
| KR | 2006008343 A | * | 1/2006 |
| WO | WO 2003/024633 A1 | | 8/2003 |
| WO | WO 2007081114 A1 | * | 7/2007 |

OTHER PUBLICATIONS

English Translation of KR-2006-008343 to Kato (obtained Nov. 2012 from KIPO).*
International Search Report and Written Opinion, mailed Jun. 21, 2012 from corresponding International Application No. PCT/CN2007/000907, mailed Jan. 3, 2008; 13 pages.
Supplementary European Search Report from corresponding European Application No. EP 07720481.6, mailed Apr. 27, 2012; 7 pages.

* cited by examiner

*Primary Examiner* — Lucas Stelling
(74) *Attorney, Agent, or Firm* — Kilpatrick Townsend & Stockton LLP

(57) ABSTRACT

The present discloses a method and a device for biogenic waste, or bio-waste treatment, and said method is as follows: Firstly, the biogenic waste is evenly mixed with water vapor, or steam, heating and pressurizing so that the temperature reaches 130-190° C. and the pressure reaches 1.5-1.9 MPa after mixture, and this state is maintained for 1-25 minutes; Then, the pressure of the mixture of said biogenic waste and water vapor is reduced to normal pressure, such as atmospheric pressure so as to conduct low-molecularization, such as decreasing or reduction of molecular weight of the biogenic waste to obtain a low-molecularized mixture, such as a low molecular weight mixture; finally, the low-molecularized mixture, such as low-molecular weight mixture is separated so as to obtain the final products. Said device includes reaction vessel, stirring device, vapor input device, pressure-reducing regulator and separation device.

12 Claims, 3 Drawing Sheets

METHOD AND DEVICE FOR BIOGENIC WASTE TREATMENT

FIELD OF THE INVENTION

The present invention relates to a method and a device for waste treatment, and more particularly relates to a method and a device for biogenic waste treatment, in which biogenic waste are placed in sealed reaction vessel for waste treatment to generate high added value products.

DESCRIPTION OF THE PRIOR ART

It is common knowledge that the treatment and recovery utilization of wastes have important social and economic significance. Many specialists have long been devoted to the research on the methods for the treatment and recovery of wastes in order to achieve the objectives of the recycle of wastes, resources conversation and environment protection.

In the prior art, there have been multiple methods for the treatment and recovery of wastes, mainly including landfill, incineration and chemical treatment.

The landfill treatment fails to realize the sufficient recycle of resources. Furthermore, because of those substances that are difficult to degrade, landfill treatment is not environment-friendly.

In the process of incineration of wastes, a large quantity of harmful gases can be generated, causing atmospheric pollution and potential safety hazards. In addition, as for the wastes with high water content such as sludge, pulp and domestic wastes, it is necessary to perform dewatering via dewatering equipment. However, the present dewatering equipment is insufficient to reduce the water content of the wastes to the extent for direct incineration, so it is still required to add combustion-supporting fossil fuel into dewatering equipment resulting in high treatment cost and long treatment time.

In the process of chemical treatment of wastes, as a general rule, chemical reagents such as acid and/or alkali are firstly used to decompose the wastes into fine sizes, and then subsequent treatments are performed to finally obtain the substances that comply with relevant requirements. For example, in the process of producing liquid fuels (such as ethanol) with biogenic waste as raw materials, to smoothly shift to the next industrial flow, chemical reagents such as dilute sulphuric acid are used at the time of pre-treatment. This waste treatment method is not only complicated and time consuming but also requires high energy consumption and has low yield. Furthermore, since chemical reagents such as acid and/or alkali are added at the time of pretreatment, it is not an environmental-friendly method.

In a word, neither landfill treatment method nor incineration treatment method can generate high added value products, and it is also very difficult to acquire high added value products using chemical treatment method. Therefore, said three kinds of treatment methods do not meet the purpose of resources conservation, cyclic utilization and environment protection.

The utilization of subcritical water for waste treatment is a new waste treatment method emerging in recent years (CN 200380102845.1). So-called subcritical water refers to the water in the state of being closely below the critical point (critical temperature 374.4° C., critical pressure 22.1 MPa). Based on the decomposition effect of subcritical water on substance, this method is designed to conducting low-molecularization of the wastes. Yoshida Hiroyuki summarized the possibility for applying subcritical water in the treatment of wastes in agriculture, forestry and animal industry. Although this method can realize very effective treatment of biogenic waste such as fish bone, fish scale, sludge and waste wood, the temperature and pressure required for performing this treatment method are rather high (374.4° C. and 22.1 MPa), and this method has harsh requirements for equipment and needs high energy consumption. Furthermore, regarding how to further separate the products obtained through this treatment method, there has been no existing relevant technology available for reference.

SUMMARY OF THE INVENTION

To overcome the deficiencies of the prior art in waste treatment, the technical objects of the present invention is to provide a method and a device for biogenic waste treatment, which is capable of generating products with high added value and realizing sufficient recycle of said biogenic waste, and which is characterized by moderate, simple and convenient operating conditions and low energy consumption while achieving ideal treatment effect and being environmental friendly.

The present invention firstly provides a method for biogenic waste treatment, which includes the following steps:

Step 1: the biogenic waste are evenly mixed with water vapour so that the temperature reaches 130-190° C. and the pressure reaches 1.5-1.9 MPa after being mixed, and this state lasts for 1-25 minutes;

Step 2: the pressure of the mixture of said biogenic waste and water vapour is reduced to normal pressure so as to conducting low-molecularization of the biogenic waste and obtain a low-molecularized mixture;

Step 3: the low-molecularized mixture is separated so as to obtain the final product.

When the biogenic waste is mixed with water vapor in Step 1, the biogenic waste is stirred so that the biogenic waste are evenly mixed with the water vapor.

More particularly, in Step 1 of said method for biogenic waste treatment, when mixing the biogenic waste with water vapor, the biogenic waste are stirred so that the biogenic waste is evenly mixed with the water vapor, and such stirring is preferably started when the temperature has reached 130-190° C. and the pressure has reached 1.5-1.9 MPa so as to achieve better mixing effect and save energy.

Further, in Step 2 of said method for biogenic waste treatment, the time for reducing the pressure of the mixture of said biogenic waste and water vapor to normal pressure is 30-60 seconds.

Further, in Step 3 of said method for biogenic waste treatment, for the purpose of separating the low-molecularized mixture, centrifugal separation, static separation, pressurized separation, membrane separation or their combination are adopted.

To prevent the low-molecularized mixture from being oxidized or being intruded by infectious microbe, prior to separating the low-molecularized mixture in Step 3 of said method for biogenic waste treatment, inactive gases, such as nitrogen gas, helium gas, neon or other inert gases are added into the mixture to avoid the oxidization occurring and the interfusion of some microorganisms.

In Step 3 of said method for biogenic waste treatment, when separating the low-molecularized mixture, liquid solid separation method is firstly adopted to perform liquid solid separation for the low-molecularized mixture, and low-molecularized liquid constituents and solid constituents are collected. To maintain the temperature of said low-molecularized mixture for liquid solid separation to be equivalent to the temperature for conducting the low-molecularization, preferably, prior to performing liquid solid separation for said mixture, heat exchange for said low-molecularized mixture is firstly conducted. To reduce the temperature of low-molecularized liquid constituents after collection, after performing liquid solid separation for said low-molecularized mixture and before collecting the low-molecularized liquid constituents, heat exchange is conducted for said liquid constituents.

To achieve said technical object, the present invention also provides a device for biogenic waste treatment, including:

A reaction vessel, which is used for holding different kinds of wastes to conduct hydrothermal reaction, and the reaction conditions are maintained as follows for 1-25 minutes: the temperature is 130-190° C. and the pressure is 1.5-1.9MPa;

A stirring device, which is disposed in said reaction vessel and is designed to stir the wastes in the reaction vessel;

A vapor input device, which is communicated with said reaction vessel and is designed to supply medium-pressure vapor to said reaction vessel;

A pressure-reducing regulator with its inlet being connected with said reaction vessel, which is designed to reduce the pressure of the mixture having certain temperature and pressure in the reaction vessel to normal pressure, so as to conducting the low-molecularization of the biogenetic wastes; and A separation device being communicated with to the outlet of said pressure-reducing regulator, which is designed to separate the products output from the reaction vessel and/or the mixture decompressed through said pressure-reducing regulator, so as to obtain the final product.

Further, said stirring device in said device for biogenic waste treatment comprises a rotating shaft, more than one stirring blades and a power mechanism, wherein said rotating shaft horizontally runs through said reaction vessel; said stirring blades are set on said rotating shaft inside the reactor; said power mechanism is connected with one end of the horizontal rotating shaft outside of the reactor and is designed to drive said rotating shaft to rotate. To achieve better stirring effect, it is feasible to install the stirring blade in special manner on the horizontal rotating shaft. For example, it is feasible to dispose the stirring blades vertically on the rotating shaft at intervals and slants with respect to the direction of the rotating shaft. Generally, said power mechanism can be a motor. Control commands can be output to said motor through a control device, so as to start/stop the motor or control the rotation speed of motor, and the time for stirring and the stirring speed are thus controlled.

To guarantee the air-tightness of said reaction vessel, a shaft seal device is set on the position where said rotating shaft is connected with said reaction vessel so as to seal this position where said rotating shaft is connected with said reaction vessel.

More specifically, said shaft seal device comprises fixing member, gasket and gland, wherein said fixing member is fitted on said rotating shaft and is in fixed connection with said reaction vessel; Said gasket is fitted between said rotating shaft and said fixing member; said gland is fitted on said rotating shaft, pressed on said gasket and is connected with said fixing member. To achieve better sealing effect, a plurality of said gaskets are fitted on said rotating shaft one overlapping the other. In addition, an elastic element (such as spring) or mechanical buffer unit (such as an oil buffer) is set on the position where said gland is connected with said fixing member. Said elastic element is designed to automatically hold the gland tightened, so as to prevent vapor leakage and guarantee constant pressure in the reaction vessel. In this way, the rotating shaft and reaction vessel are sealed by means of the gasket and gland, so that the reaction vessel has very good thermal insulation property and air tightness and thus can preferably complete the reaction of the low-molecularization of the mixture.

Said pressure-reducing regulator in said device for biogenic waste treatment is a pressure-reducing regulating valve. By controlling this pressure-reducing regulating valve, the set-on point and duration for decompression in the reaction vessel are controlled.

In said device for biogenic waste treatment, said separation device comprises:

A first-stage separation device and a second-stage separation device, wherein said first-stage separation device is designed to perform solid-liquid separation for the mixture that is output from said reaction vessel and is decompressed through said pressure-reducing regulator; said second-stage separation device is connected with said first-stage separation device and/or said reaction vessel and is designed to perform secondary separation for the product output from said reaction vessel and/or the product separated from said first-stage separation device so as to obtain the final product.

In said device for biogenic waste treatment, said first-stage separation device comprises liquid-solid separator, solid collecting tank and liquid collecting tank, wherein the inlet of said liquid-solid separator is connected with said pressure-reducing regulator through pipeline, the separated liquid is output to said liquid collecting tank through liquid outlet, and the separated solid is output to said solid collecting tank through solid outlet.

In addition, a first heat exchanger is provided between said liquid solid separator and said pressure-reducing regulator and is designed to maintain the temperature of the low-molecularized mixture undergoing liquid solid separation to be equivalent to the temperature for conducting the low-molecularization; a second heat exchanger is provided between said liquid solid separator and said liquid collecting tank and is designed to condense the liquid output from said liquid solid separator. Said first heat exchanger or second heat exchanger can be coil pipe heat exchanger.

Said liquid solid separator in said device for biogenic waste treatment is 5-15 meters above said pressure-reducing regulator.

In said device for biogenic waste treatment, said second-stage separation device comprising: centrifugal separation device or/and static separation device or/and pressurized separation device or/and pressure separation device or/and membrane treatment device. Since these separation devices can be regular separation devices which belong to commonly known technologies, it is unnecessary to describe their structures herein.

In addition, in the present invention, there are may be a plurality of said reaction vessels that are set in parallel, and the number of the stirring devices, the vapor input devices and the pressure-reducing regulators connected with said reaction vessels corresponds to the number of said reaction vessels.

Said biogenic wastes concerned in the present invention include different kinds of wastes generated from agriculture, forestry, industry, stock raising, fishery and daily life. The examples of said biogenic wastes generated from agriculture include soil, rice husk, straw, crop stalk, garlic, sweet potato and sunflower etc.; the examples of said biogenic wastes generated from forestry include bamboos, fir plants and maidenhair tree etc.; the examples of said biogenic wastes from industry include the residue from granulated sugar manufacturing, soybean residue and lees; the examples of said biogenic wastes from stock raising include livestock sludge, chicken manure, swine waste, cattle manure and bird features etc.; the examples of said biogenic wastes generated from fishery include crab shell, shell, fish skin, shrimp shell and scallop viscera gland, broken kelp, alga and seaweed etc.; the examples of said biogenic wastes generated from daily life include domestic wastes, sludge of sewer, lake and river, waster paper, food residue and medical wastes etc.

The method and device provided by the present invention can be used to treat different kinds of biogenic wastes, featuring convenient operations, low energy consumption, moderate and simple operating conditions and good treatment effect. High added value products can be obtained after treatment. For example, some products can be directly used as fuel, fertilizer and feedstuff, and some others can be used as the raw materials for medicines, cosmetics, flavoring and nutritious health products. As a result, said biogenic wastes can be sufficiently recycled. Therefore, the present invention complies with the production concept "environmental protection, cyclic utilization, resources conservation and changing wastes into valuables".

The technical solution of the present invention is elaborated below with reference to the attached figures and the specific embodiments.

DETAILED DESCRIPTION OF THE PREFERRED EMBODIMENTS

Figure 1:
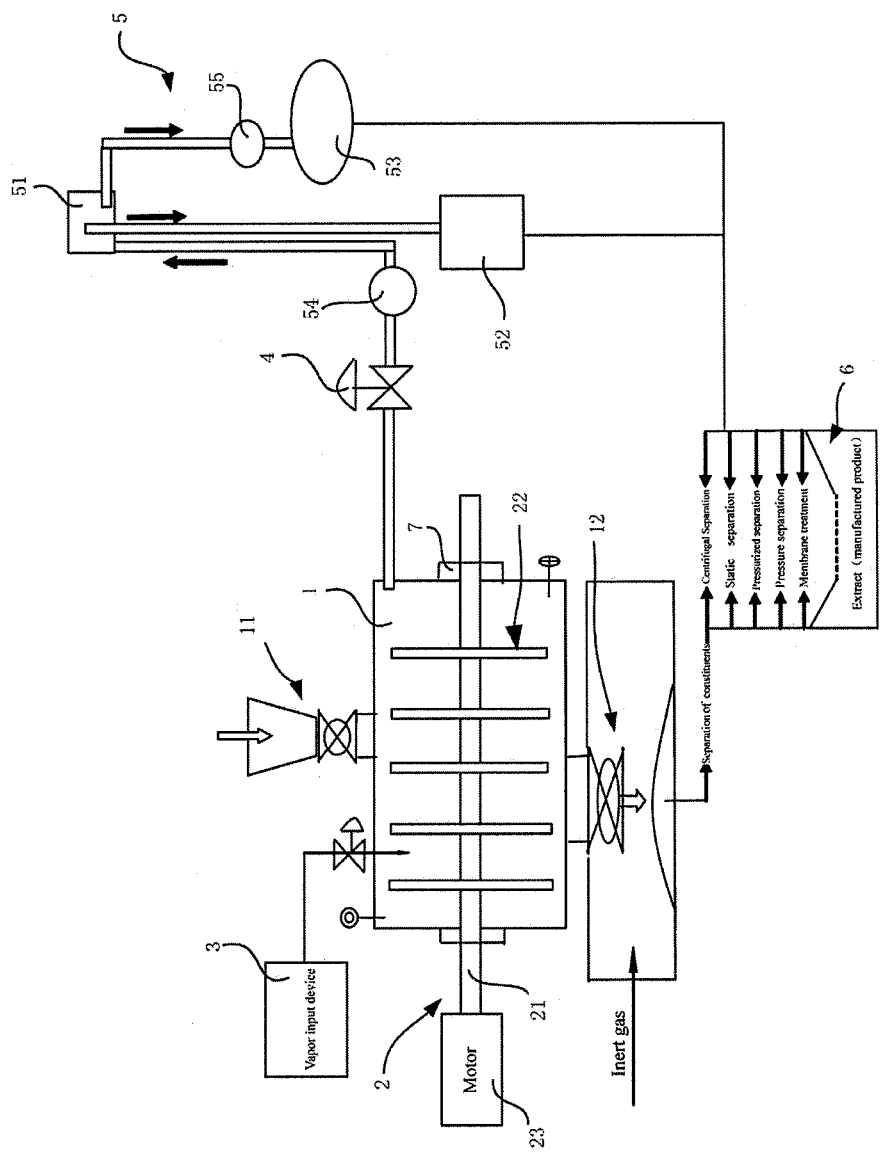
FIG. 1 is the structural diagram of an embodiment of said device for biogenic waste treatment of the present invention.

In order to treat biogenic wastes so as to generate products with high added value and sufficiently recycle said biogenic wastes, the present invention provides a device and a method for biogenic waste treatment. The schematic diagram of an embodiment of said device is as shown in FIG. 1. The device for biogenic waste treatment in this embodiment comprises: the reaction vessel 1 that holds various wastes for hydrothermal reaction; the stirring device 2 designed to stir the wastes in the reaction vessel; the vapor input device 3 designed to supply medium-pressure vapor to the reaction vessel; the pressure-reducing regulating valve 4; the liquid solid separation device 5 and the second-stage separation device 6 that are designed to separate and hold the liquid and solid constituents in the reaction vessel after sudden pressure drop.

Wherein, said reaction vessel 1 is made of medium pressure resistant material; At least a feed inlet 11 is set on the upper part of reaction vessel, and an outlet 12 is set on the lower part of reaction vessel. The volume of said reaction vessel 1 is 3-7 m³. Temperature transducer and pressure transducer (not shown in the figure) are also provided on the reaction vessel 1 to detect the temperature and pressure in the reaction vessel 1.

A stirring device 2 is set inside the reaction vessel 1, wherein said stirring device 2 includes a rotating shaft 21 that horizontally runs through the reaction vessel 1; more than one mixing blades 22 are set on the rotating shaft 21 inside the reaction vessel 1; said stirring blades 22 are installed on the rotating shaft 21 at intervals. To achieve better stirring effect, it is feasible to dispose the stirring blades 22 vertically on the rotating shaft 21 at intervals and slants with respect to the direction of the rotating shaft. Power mechanism (such as motor 23) is connected with one end of the horizontal rotating shaft 21 outside of reactor and is designed to drive the rotating shaft 21.

To guarantee that said reaction vessel 1 can maintain constant pressure in the reaction process, a sealing device is set on the position where said reaction vessel 1 is connected with the environment, wherein said sealing device comprises: the first and second sealing elements that are set at the feed inlet and discharge outlet of reaction vessel respectively; said first and second sealing elements are common sealing devices in prior art, such as electric ball valve made of high temperature and high pressure resistant material; At the point where the reaction vessel 1 contacts with said stirring device 2 on both ends of reaction vessel 1, shaft seal devices 7 are respectively provided.

Figure 2:
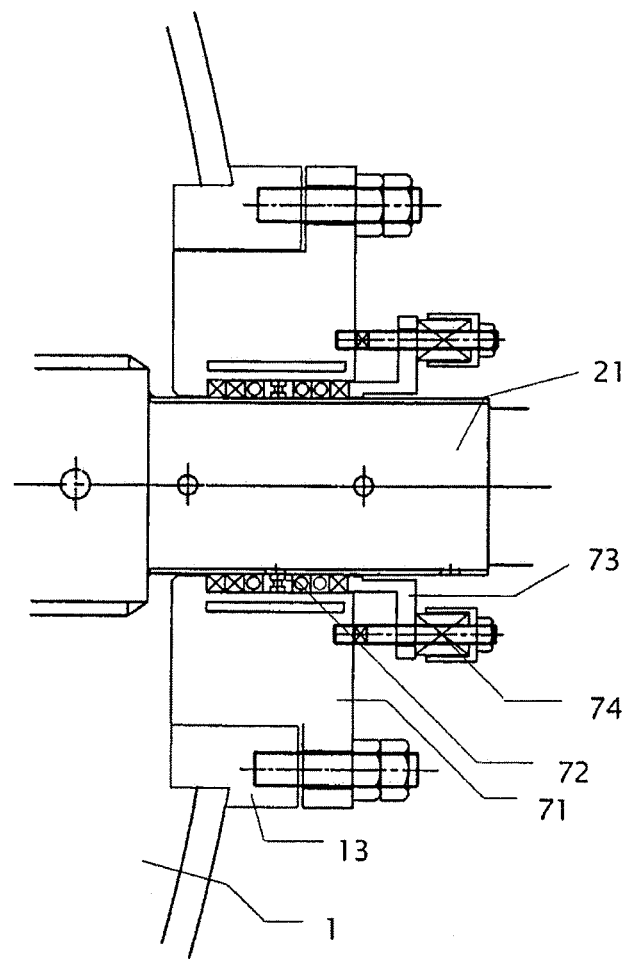
FIG. 2 is the structural diagram of the shaft seal device in an embodiment of said device for biogenic waste treatment of the present invention.

The structural diagram of said shaft seal device 7 is shown in FIG. 2, wherein said shaft seal device 7 comprises a fixing member 71, which is fitted on said rotating shaft and is in fixed connection with said reaction vessel 1; a gasket 72, which is fitted between said rotating shaft 21 and said fixing member 71; a gland 73, which is fitted on said rotating shaft 21, pressed on said gasket 72 and is connected with the fixing member 71. A spring 74 is set at where the gland is fixed by the bolt. When the gasket 72 with sealing function is worn out, the spring 74 will automatically hold the gland 73 tightened, so as to prevent vapor leakage and guarantee constant pressure in the reaction vessel 1. There may be a plurality of (such as 1-6) said gasket 72, which can be designed as spherical gasket to achieve better sealing effect. In this embodiment, spherical gaskets are liable to damage under certain temperature and pressures, therefore a plurality of spherical gaskets are preferable, and 6 spherical gaskets are optimal. A connecting piece 13 is welded on the reaction vessel, and it is to be connected with said fixing part 71 through bolts.

Said vapor input device 3 comprises the equipment for generating medium-pressure vapor as well as the vapor input pipeline designed to supply the generated vapor to the reaction vessel 1; regulating valves are set on the pipeline to regulate the flow of vapor input to the reaction vessel 1. The vapor input device 3 is located on the position above the reaction vessel 1 and the horizontal rotating shaft 21 and is basically set in the horizontal direction, so that the wastes can contact the medium-pressure vapor to the greatest extent. The pressure in the reaction vessel 1 is regulated by the input quantity of medium-pressure vapor. Furthermore, since the temperature corresponds to the pressure of medium-pressure vapor, the temperature in the reaction vessel is also regulated by the input quantity of medium-pressure vapor.

The upper part of reaction vessel 1 is connected with the pressure-reducing regulating valve 4 through pipeline, and the pressure-reducing regulating valve 4 is connected to the liquid solid separation device 5 via pipelines passing a silencer (Not shown in the figure). The advantage of providing the silencer lies in reducing the noise generated by the equipment in operation, so that this waste treatment device can be set in the urban area and complies with the requirements for environmental protection.

Said pressure-reducing regulating valve 4 can be selected as electrically operated valve or manually operated valve. Said pressure-reducing regulating valve 4 has the functions in the following two aspects: ①, at the stage of reaction, it is used to keep constant pressure in the reaction vessel 1. When the pressure in the reaction vessel 1 has exceeded the given value, the pressure regulating valve is opened to discharge the pressure in the reaction vessel 1; At the suitable time, shut off the valve, so that given pressure is maintained in the reaction vessel 1; ② To realize the sudden pressure drop in the reaction vessel 1. After the reaction of wastes under given temperature and pressure in the reaction vessel 1 lasts a given time, the pressure-reducing regulating valve 4 is opened, so that the pressure in the reaction vessel 1 suddenly drops to the normal pressure. Through said sudden pressure drop, the reaction product is blasted and the wastes are low-molecularized, so as to realize the sufficient recycling of biogenic wastes.

The liquid solid separation device 5 includes liquid solid separator 51, solid collecting tank 52 and liquid collecting tank 53. Said liquid solid separator 51 is connected with the reaction vessel 1 by means of pipeline. To keep the temperature of the reaction products, this pipeline is made of heat insulating material. Said liquid solid separator 51 may be common liquid solid separator in prior art, such as conventionally used centrifugal hydro extractor, which is driven to rotated in high speed by the huge kinetic energy of the blasting reaction products instead of other external force. It can be seen such a liquid solid separation method is remarkably energy efficient.

Said liquid solid separator 51 is set at the position which is higher than the pressure-reducing regulator by 5-15 meters. After liquid solid separation, due to gravity, the separated liquid and solid constituents travel to said solid collecting tank 52 and liquid collecting tank 53 respectively. The liquid solid separator 51 shall be set at a suitable height, such that the substances to be separated can be subject to sufficient liquid solid separation, and the liquid solid separator 51 would not be damaged by the huge kinetic energy of reaction product. Generally speaking, the blasting time is closely related to the height of the setting position of liquid solid separator 51, that is to say, if the blasting time is shorter, the speed at which the reaction products rush out of pipeline after blasting is higher, in such case it is necessary to set the liquid solid separator 51 at higher position. On the other hand if the blasting time is longer, the speed at which the reaction products rush out of pipeline after blasting is lower, then it is necessary to set the liquid solid separator 51 at lower position. If the height is too high, the substances to be separated will fail to access the liquid solid separator 51; in case of too low height, the reaction products rushing out at extremely high speed will damage the liquid solid separator 51.

In addition, the reaction products output from the reaction vessel 1 by way of pressure-reducing regulating valve 4 will have thermal loss more or less, it is feasible to set the first heat exchanger 54 before said liquid solid separation device, so as to keep the temperature at the time of liquid solid separation to be equivalent to the temperature of the reaction vessel. It is also feasible to set the second heat exchanger 55 before said liquid collecting tank 53, so as to quickly condense and liquefy the liquid constituents and thus achieve better separating effect. The heat exchanger used herein can be selected as conventional heat exchanger, such as coil pipe heat exchanger.

The low-molecularized solid constituents and liquid constituents obtained through the first-stage liquid solid separation can also be subject to secondary separation. The second-stage separation device 6 comprises centrifugal separation device, static separation device, pressurized separation device, pressure separation device, membrane treatment device or certain combination of them. For some biogenic wastes, after low-molecularizing blasting in the reaction vessel 1, their active constituents are discharged from the discharge outlet 12 of reaction vessel; the discharged active constituents, then are treated using inactive gases such as inert gas, and then go through said second-stage separation in device 6, finally the extracts obtained are the desired final products.

Figure 3:
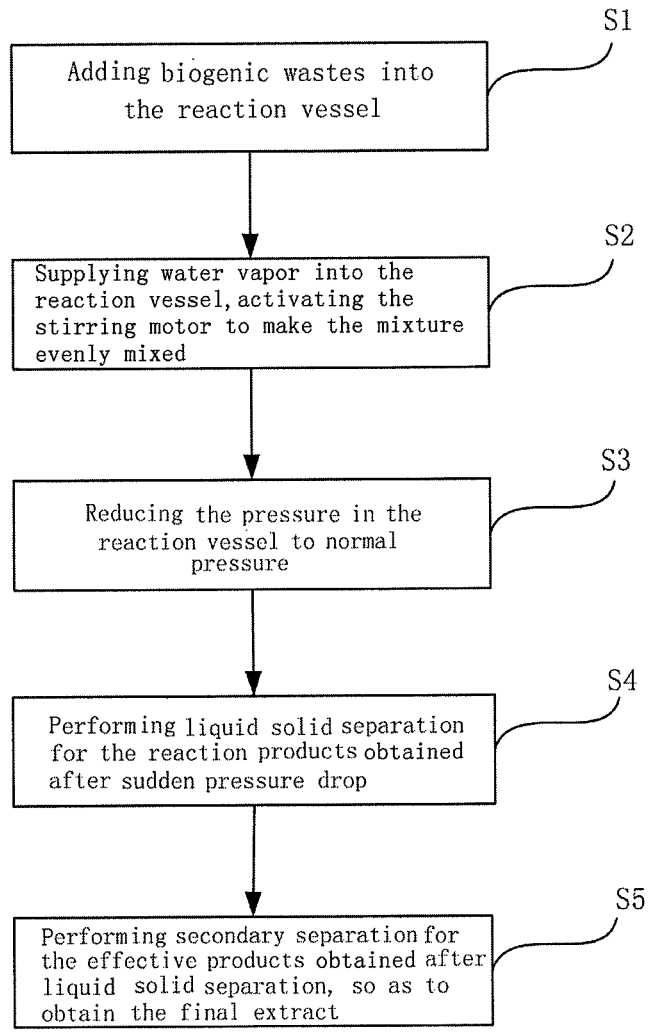
FIG. 3 is the flow chart of an embodiment of said method for biogenic waste treatment of the present invention.

In response to the technical object of the present invention, the present invention also provides a method for biogenic waste treatment. In combination with the device described above and the flow chart of an embodiment shown in FIG. 3, the method is described as follows:

Step S1: The biogenic wastes are added into the reaction vessel via the feed inlet of reaction vessel;

Step S2: After the feed inlet is closed, water vapor is supplied into the reaction vessel; the temperature and pressure in the reaction vessel are maintained at given values, and the stirring motor is activated and keeps stirring the biogenic waste for certain time until they are evenly mixed.

Step S3: The pressure-reducing regulating valve is opened, so as to suddenly reduce the pressure in the reaction vessel to normal pressure;

Step S4: By means of liquid solid separation device, liquid and solid constitutes of the reaction products obtained through sudden pressure drop are separated.

Step S5: A secondary separation for the effective products after liquid solid separation is performed so as to obtain the final extracts, namely the manufactured products.

The five steps described above constitute a preferred process. The stirring operation in Step S2 may also be started when adding biogenic wastes into the reaction vessel via the feed inlet of reaction vessel, and it is advisable to slowly add biogenic wastes while stirring.

In this embodiment, only when the temperature and pressure of reaction vessel have reached given values and keep constant, the stirring motor is then to be activated to stir the added biogenic wastes. To realize thorough mixing of the biogenic wastes in the reaction vessel, it is feasible to change the rotation direction of stirring blades at intervals.

The pressure and temperature in the reaction vessel are regulated by regulating the input quantity of water vapor, so that the pressure and temperature in the reaction vessel reach the given values and maintain for a period of time. Generally, the given value of the pressure in the reaction vessel is 1.5-1.9 MPa, the given value of the temperature is 130-190° C., both of which shall be kept for 1-25 minutes. Said range of values varies according to different kinds of treated wastes and final products. Generally speaking, higher temperature and pressure and longer reaction time are needed for the inorganic substances and protein biogenic wastes that are difficult to conduct the low-molecularization, such as sewage sludge, contaminated soil, livestock wastes, lees, waster paper, scallop viscera gland and animal carcass etc., for example, such higher temperature and pressure can be 170-190° C., 1.70 Mpa-1.9 Mpa and such longer reaction time can be 15 minutes or even 25 minutes so that these wastes can be sufficiently converted into low-molecularized substances; For those carbohydrate type biogenic wastes that are easily converted into low-molecularized substances, such as rice husk, straw, sunflower, bamboos, seaweed and flowers, lower temperature and pressure and shorter reaction time, for example temperature of 130-150° C. and below, pressure of 1.50 Mpa-1.60 Mpa and below and reaction time of 3-10 minutes, are needed to convert these wastes into low-molecularized substances.

In step 3, when the biogenic wastes under certain temperature and pressure environment have been stirred for given time in the reaction vessel, the pressure-reducing regulating valve is opened to suddenly reduce the pressure in the reaction vessel to normal pressure.

The blasting time, namely the time required for sudden pressure drop from given pressure to normal pressure, has crucial affects to the particle diameter size, its distribution, products composition and their content in the final products of biogenic wastes. Generally, under the same pressure, the higher the speed of sudden pressure drop is, the smaller the particle diameter size and the narrower the distribution of particle diameter is; To the contrary, the lower the speed of sudden pressure drop is, the bigger the particle diameter and the wider the distribution is.

Determination of said blasting time is related to the kind of biogenic waste and the purpose of final product. Firstly, the blasting time is related to the kind of biogenic waste. For those inorganic substances and protein biogenic wastes that are difficult to conduct the low-molecularization, such as contaminated soil, crab shell, shrimp shell, livestock waste, lees, waste paper and scallop viscera gland, shorter blasting time is needed, such as 35-40 seconds, so that these wastes can be converted into low-molecularized substances to higher extent. For the carbohydrate type biogenic wastes that can be easily converted into low-molecularized substances, such as rice husk, straw, broken kelp and flowers, longer blasting time (for example, 50-60 seconds) can be used to convert these wastes into low-molecularized substances. On the other hand, the blasting time is related to the purpose of the final product. For example, for the wastes with their the final products being used as feedstuff and fertilizer, it is feasible to use relatively shorter blasting time; However, for the wastes with their final products being used as the raw materials for medicines, cosmetics, flavoring and nutritious health products, it is necessary to use even shorter blasting time. In the present invention, the blasting time is 30-60 seconds.

The substances generated due to sudden pressure drop will rush out of said reaction product discharge pipeline and pressure regulating valve, then rush at the liquid solid separator located vertically above it; the solid matters obtained through separation are collected into the solid collecting tank located on its lower part through the solid discharge pipeline; the liquid matters obtained through liquid solid separation and condensation are collected to the liquid collecting tank also located on its lower part through the liquid discharge pipeline.

It is also feasible to perform secondary separation for the products after liquid solid separation so as to obtain the final extracts, namely the manufactured product.

It is feasible to realize the treatment method of the present invention by controlling the treatment device of the present invention by means of control device. For example, temperature transducers and pressure transducers can be set in the reaction vessel to acquire the data of temperature and pressure in the reaction vessel and to transmit the values to a central processing unit, such as a computer. Actuating mechanism can be set on the feed inlet and outlet of reaction vessel to automatically open the feed inlet and outlet of reaction vessel. Automatic valve is set in the water vapor input device, the pressure-reducing regulator is set as automatic valve, and various separation devices are also designed as automatic devices. Procedures of the reaction can be programmed and store the program into the central processing unit, such as computer, and the central processing unit will exercise control over the treatment processes according to the program. This process is a typical process control. For the common technicians in the field of automatic control field, realization of this process control according to the method provided by the present invention is a common art, and thus it is unnecessary to describe such technology herein.

According to the method of the present invention, it is feasible to treat many kinds of biogenic wastes, so as to achieve the objective of waste utilization. Said biogenic wastes include different kinds of wastes generated from agriculture, forestry, industry, stock raising, fishery and daily life. The examples of said biogenic wastes generated from agriculture include soil, rice husk, straw, crop straw, garlic, sweet potato and sunflower; The examples of said biogenic wastes generated from forestry include bamboos, fir plants and maidenhair tree; the examples of said biogenic wastes from industry include the residue from granulated sugar manufacturing, soybean curd residue and lees; The examples of said biogenic wastes from stock raising include livestock sludge, chicken manure, swine waste, cattle manure and bird features; The examples of said biogenic wastes generated from fishery include crab shell, shell, fish skin, shrimp shell and scallop viscera gland, broken kelp, alga and seaweed; the examples of said biogenic wastes generated from daily life include domestic wastes, sludge of sewer, lake and river, waster paper, food residue and medical wastes.

According to the treatment method of the present invention, the conditions required for treatment of various biogenic wastes in some embodiments as well as their products are shown in Table 1:

TABLE 1

| Name of waste | Utilization of product | Temperature condition | Pressure condition | Decompression time |
| --- | --- | --- | --- | --- |
| Tea fruits | Medicine, edible oil, cosmetics | 145° C.> | 1.3 MPa> | 45 Sec> |
| Fish skin | Cosmetics | 155° C.> | 1.4 MPa> | 48 Sec> |
| Carapace of crab, shell | Medicines, special fertilizer components | 160° C.> | 1.5 MPa> | 30 Sec> |
| Shrimp shell | Medicines, special fertilizer components | 165° C.> | 1.55 MPa> | 30 Sec> |
| Combs (chicken crests) | Medicines, fertilizers and feedstuff | 150° C.> | 1.3 MPa> | 40 Sec> |
| Scallop viscera gland | Fertilizers, food stuffs and flavoring | 180° C.> | 1.7 MPa> | 35 Sec> |
| Sewage sludge | Fertilizer, fuel | 168° C.> | 1.55 MPa> | 48 Sec> |
| Lake sludge | Fertilizer | 165° C.> | 1.55 MPa> | 48 Sec> |
| River sludge | Fertilizer | 168° C.> | 1.6 MPa> | 45 Sec> |
| Bamboos, small bamboos | Medicines, fertilizers and feedstuff | 160° C.> | 1.5 MPa> | 35 Sec> |
| Agricultural residue | Medicines, fertilizers and feedstuff | 165° C.> | 1.55 MPa> | 48 Sec> |
| Fishery residue | Medicines, fertilizers and feedstuff | 165° C.> | 1.55 MPa> | 45 Sec> |
| Contaminated soil | Purification | 185° C.> | 1.75 MPa> | 35 Sec> |

TABLE 1-continued

| Name of waste | Utilization of product | Temperature condition | Pressure condition | Decompression time |
|---|---|---|---|---|
| Various Chinese herbal medicines | Medicines and pharmaceutical intermediates | 155° C.> | 1.4 MPa> | 45 Sec> |
| Seaweed | Medicines and health products | 155° C.> | 1.4 MPa> | 45 Sec> |
| Domestic wastes | Fertilizer and fuel | 175° C.> | 1.65 MPa> | 40 Sec> |
| Flowers | Edible oil, medicines and cosmetics | 148° C.> | 1.3 MPa> | 45 Sec> |
| Oil sludge | Fuel | 175° C.> | 1.65 MPa> | 50 Sec> |
| Sludge generated from food manufacturing | Fertilizer | 165° C.> | 1.55 MPa> | 50 Sec> |
| Animal carcasses as well as the waste materials of meat manufacturing | Feedstuff, fertilizer | 185° C.> | 1.75 MPa> | 45 Sec> |

In addition, when using the treatment device provided by the present invention to treat various wastes according to the method provided by the present invention, it is necessary to detect the post-treatment product. Some embodiments that have been detected are shown in Table 2:

TABLE 2

| Name of waste | Temperature (° C.) | Duration of stirring (min) | Pressure (Mpa) | Decompression time (sec) | Molecular diameter O.D (nm) | Bacterial count (cfu/g) |
|---|---|---|---|---|---|---|
| Rice husk | 140 | 5 | 1.6 | 55 | 0.54 | Undetected |
| Straw | 138 | 3 | 1.55 | 60 | 0.23 | Undetected |
| Milk | 135 | 7 | 1.55 | 45 | 0.22 | Undetected |
| Sewage sludge | 170 | 22 | 1.85 | 45 | 0.32 | 100 cfu/g |
| Livestock wastes | 168 | 15 | 1.82 | 40 | 0.22 | Undetected |
| Fishery waste | 175 | 10 | 1.65 | 45 | 0.23 | Undetected |
| Soil | 155 | 9 | 1.55 | 35 | 0.98 | 50 cfu/g |
| Food residue | 148 | 9 | 1.6 | 45 | 0.45 | Undetected |
| Residue from granulated sugar manufacturing | 155 | 6 | 1.65 | 35 | 0.33 | Undetected |
| Lees | 170 | 18 | 1.75 | 35 | 0.32 | Undetected |
| Soybean curd residue | 140 | 7 | 1.45 | 45 | 0.28 | Undetected |
| Bamboos | 138 | 1 | 1.45 | 50 | 0.54 | Undetected |
| Garlic | 145 | 1 | 1.44 | 35 | 0.43 | Undetected |
| Bird feathers | 148 | 8 | 1.55 | 50 | 0.45 | Undetected |
| Waste paper | 169 | 20 | 1.8 | 35 | 0.77 | Undetected |
| Tea fruit | 157 | 4 | 1.67 | 45 | 0.25 | Undetected |
| Broken kelp | 148 | 4 | 1.48 | 55 | 0.33 | Undetected |
| Sweet potato | 148 | 12 | 1.77 | 37 | 0.26 | Undetected |
| Seaweed | 130 | 6 | 1.55 | 36 | 0.33 | Undetected |
| Sunflower | 135 | 6 | 1.56 | 36 | 0.23 | Undetected |
| Infectious medical wastes | 175 | 6 | 1.7 | 35 | 0.22 | Undetected |

In addition, according to the treatment method provided by the present invention, different wastes can be processed into products with different purposes, and some embodiments are shown in Table 3:

TABLE 3

| Name of waste | Names of extracts |
|---|---|
| Rice husk | Field weeding material, anti-insect material and slight-explosion material for recycling use in manufacturing of products |
| Straw | Field weeding material, organic fertilizer, mushroom culture medium and wood processing through microorganism |
| Milk | Organic fertilizer, fermented food |
| Sewage sludge | Organic fertilizer, liquid organic fertilizer, wood processing through microorganism, solid fuel, gasified fuel |
| Livestock wastes | Organic fertilizer, wood processing through microorganism |
| Aquatic waste | Feedstuff for fish culturing, liquid organic fertilizer |
| Soil | The soil used for rearing of seedling as well as the disinfections and recycle of other sands and soils |

TABLE 3-continued

| Name of waste | Names of extracts |
|---|---|
| Food residue | Extraction of constituents such as cattle food, organic fertilizer and polyphenols |
| Residue from granulated sugar manufacturing | The preliminary treatment for the manufacture liquid fuel (biological ethanol) and the conversion of its residue into feedstuff and fertilizer |
| Lees | The manufacture of medicine, nutritional supplement food and liquid fuel (biological ethanol) |
| Soybean curd residue | Cattle food, organic fertilizer and snacks |
| Bamboos | Medicines, antibacterial materials and disinfective materials |
| Garlic | Medicines (sulfated oligosaccharides, antibiotic materials) and for converting its residue into feedstuff and fertilizer |
| Bird feathers | Minor element fertilizer with single function |
| Waste paper | Fuel, wheat straw for livestock rearing |
| Tea fruit | Special medicines |
| Broken kelp | Soup bases and condiments |
| Sweet potato | Medicines (anticancer agent etc) |
| Seaweed | Medicines and foods |
| Sunflower | Edible oil, medicines |
| Infectious medical waste | Conversion to safe general wastes |

The method and device provided by the present invention can be used to treat different kinds of biogenic wastes, featuring convenient operations, low energy consumption, moderate and simple operating conditions and good treatment effect. High added value products can be obtained after such treatment. For example, some products can be directly used as fuel, fertilizer and feedstuff, and some others can be used as the raw materials for medicines, cosmetics, flavoring materials and nutritious health products. As a result, said biogenic wastes can be sufficiently recycled. Therefore, the present invention complies with the production concept "environmental protection, cyclic utilization, resources conservation and changing wastes into valuables".

Finally it must be mentioned as follows: Said embodiments are merely used to illustrate rather than limit the present invention; Although detail description of the present invention is provided with reference to preferred embodiments, the common technologists in this field shall understand that all the modifications or equivalent substitutions to the present invention without deviation from the spirit and range of present invention shall be covered by the Claims of present invention. In addition, each reference provided herein is incorporated by reference in its entirety to the same extent as if each reference was individually incorporated by reference.

The invention claimed is:

1. A device for biogenic waste treatment comprising
A reaction vessel, which is used for holding different kinds of wastes to conduct a hydrothermal reaction, and wherein the vessel is capable of maintaining the following reaction conditions for 1-25 minutes: a temperature of 130-190° C. and a pressure of 1.5-1.9MPa;
A stirring device, which is disposed in said reaction vessel to stir the wastes in the reaction vessel;
A vapor input device, which is communicated with said reaction vessel and is designed to supply medium-pressure vapor to said reaction vessel, wherein said device for biogenic waste treatment also comprises:
A pressure-reducing regulator with its inlet being connected with said reaction vessel, which is designed to reduce the pressure in the reaction vessel to normal pressure in 30-60 seconds, so as to discharge the low molecularized biogenic wastes; and
A separation device comprising a liquid-solid separator, a solid collecting tank and a liquid collecting tank, wherein an inlet of said liquid-solid separator is connected with said pressure-reducing regulator through a pipeline; and wherein a liquid separated via liquid solid separation is output to said liquid collecting tank through a liquid outlet, and the solid separated via liquid solid separation is output to said solid collecting tank through a solid outlet; and
wherein said liquid-solid separator is set 5-15 meters above said pressure-reducing regulator.

2. The device for biogenic waste treatment according to claim 1, wherein said stirring device comprises:
A rotating shaft, which horizontally runs through said reaction vessel;
More than one stirring blade, which are set on the rotating shaft in said reaction vessel; and
A power mechanism, which is connected with one end of the horizontal rotating shaft outside of the reaction vessel, and is designed to drive said rotating shaft to rotate.

3. The device for biogenic waste treatment according to claim 2, wherein said stirring blades are vertically disposed on said rotating shaft at intervals and slants with respect to the direction of the rotating shaft.

4. The device for biogenic waste treatment according to claim 2, wherein a shaft seal device is set on the position where said rotating shaft is connected with said reaction vessel so as to seal this position where said rotating shaft is connected with said reaction vessel; said shaft seal device comprises:
a fixing member, which is fitted on said rotating shaft and is in fixed connection with said reaction vessel;
a gasket, which is fitted between said rotating shaft and said fixing member; and
a gland, which is fitted on said rotating shaft, pressed on said gasket and is connected with said fixing member.

5. The device for biogenic waste treatment according to claim 4, wherein an elastic element is provided on the position where said gland is connected with said fixing member.

6. The device for biogenic waste treatment according to claim 5, wherein said elastic element is a spring or an oil buffer.

7. The device for biogenic waste treatment according to claim 4, wherein a plurality of said gaskets are fitted on said rotating shaft one overlapping the other.

8. The device for biogenic waste treatment according to claim 1, wherein said pressure-reducing regulator is a pressure reducing regulating valve.

9. The device for biogenic waste treatment according to claim 1, wherein said separation device comprises a first stage separation device that comprises said liquid-solid separator, said solid collecting tank and said liquid collecting tank; said separation device also comprises a second-stage separation device, which is connected with said first-stage separation device and/or said reaction vessel and is designed to perform a secondary separation for products which are output by said reaction vessel and/or products which are separated from said first-stage separation device so as to obtain a final product.

10. The device for biogenic waste treatment according to claim 9, wherein a first heat exchanger is provided between said liquid-solid separator and said pressure-reducing regulator and is designed to maintain the temperature of the low-molecularized mixture for liquid solid separation to be equivalent to a temperature for conducting the low-molecularization; a second heat exchanger is provided between said liquid solid separator and said liquid collecting tank, and is designed to condense the liquid which is output from said liquid-solid separator.

11. The device for biogenic waste treatment according to claim 10, wherein said first heat exchanger or the second heat exchanger is designed as shell-and-tube heat exchanger, immersing heat exchanger, coil pipe heat exchanger or serpentine type heat exchanger.

12. The device for biogenic waste treatment according to claim 1, wherein a plurality of said reaction vessels are provided in parallel, and the number of the stirring devices, the vapor input devices and the pressure-reducing regulators connected with said reaction vessels corresponds to the number of said reaction vessels.

* * * * *